US010992221B2

(12) United States Patent
Hukel (10) Patent No.: US 10,992,221 B2
(45) Date of Patent: Apr. 27, 2021

(54) EFFICIENT BUCK-BOOST CHARGE PUMP AND METHOD THEREFOR

(71) Applicant: SEMICONDUCTOR COMPONENTS INDUSTRIES, LLC, Phoenix, AZ (US)

(72) Inventor: Miroslav Hukel, Bratislava (SK)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 18 days.

(21) Appl. No.: 15/948,048

(22) Filed: Apr. 9, 2018

(65) Prior Publication Data

US 2019/0312514 A1  Oct. 10, 2019

(51) Int. Cl.
*H02M 3/158* (2006.01)
*H02M 3/07* (2006.01)

(52) U.S. Cl.
CPC ........ *H02M 3/07* (2013.01); *H02M 2003/072* (2013.01)

(58) Field of Classification Search
CPC ................ H02M 3/07; H02M 3/1582; H02M 2001/007; H02M 2001/0045; H02M 3/073; H02M 7/10; H02M 7/103; H02M 7/106; H02M 2003/071; H02M 2003/072; H02M 2003/077; G05F 1/61; G05F 1/563; G05F 1/614
USPC ...... 323/266; 363/59, 60; 327/535, 536, 537
See application file for complete search history.

(56) References Cited

U.S. PATENT DOCUMENTS

| 5,616,945 A * | 4/1997 | Williams | ............ H01L 27/0629 257/296 |
| 2004/0080361 A1 | 4/2004 | Henry | |
| 2008/0158915 A1* | 7/2008 | Williams | ................ H02M 3/07 363/21.06 |

(Continued)

OTHER PUBLICATIONS

A4480, "Wide Input 5V, 50 mA, Automotive Regulator with Output Short-to-Battery Protection and Power OK," Product Data Sheet, Allegro Microsystems, LLC, Jun. 10, 2017, 11 pages, A4480-DS, Rev. 1, MCO-000191, Allegro MicroSystems, LLC, 115 Northeast Cutoff, Worcester, Massachusetts, 01615-0036 United States.

(Continued)

*Primary Examiner* — Emily P Pham
*Assistant Examiner* — Monica Mata
(74) *Attorney, Agent, or Firm* — Polansky & Associates, P.L.L.C.; Paul J. Polansky (57) ABSTRACT

A buck-boost charge pump includes a flying capacitor and a switch network. The switch network couples an input terminal to a first terminal of the flying capacitor using a first double switch and the second terminal of the flying capacitor to a power supply voltage terminal using a second switch in a charging phase of a boost mode, the input terminal to the second terminal of the flying capacitor using a third switch and the first terminal of the flying capacitor to an output terminal using the fourth switch in both a discharging phase of the boost mode and a charging phase of a buck mode, and the power supply voltage terminal to the first terminal of the flying capacitor using a first switch and the second terminal of the flying capacitor to the output terminal using a second double switch in a discharging phase of the buck mode.

20 Claims, 8 Drawing Sheets

(56) References Cited

U.S. PATENT DOCUMENTS

2010/0066169 A1* 3/2010 Apfel .................. H02M 3/156
                                                    307/31
2012/0112724 A1   5/2012 Nishida
2013/0301314 A1* 11/2013 Fu ....................... H02M 7/487
                                                    363/37
2014/0070787 A1   3/2014 Arno

OTHER PUBLICATIONS

FAN5602, "Universal (Step-Up/Step-Down) Charge Pump Regulated DC/DC Converter," Product Data Sheet, Fairchild Semiconductor Corporation, Aug. 2009, 15 pages, FAN5602, Rev. 1.5.3, Fairchild Semiconductor Corporation, P.O. Box 5163, Denver, Colorado 80217 United States.

* cited by examiner

EFFICIENT BUCK-BOOST CHARGE PUMP AND METHOD THEREFOR

FIELD OF THE DISCLOSURE

The present disclosure relates generally to power conversion circuits, and more particularly to charge pump converters.

BACKGROUND

DC-to-DC converters are power converters that convert one direct current (DC) voltage into another DC voltage. If the converter converts an input voltage from a lower voltage to a higher output voltage, it is known as a boost converter. A boost charge pump converter uses switches and a capacitor to alternatively connect a first terminal of the capacitor to an input voltage and the second terminal to ground in a charging phase, and the first terminal of the capacitor to the output terminal and the second terminal of the capacitor to the input terminal in a discharging phase. If the converter converts a higher voltage to a lower output voltage, it is known as a buck converter. A buck charge pump converter alternatively connects the first terminal of the capacitor to the input and the second terminal of the capacitor to the output voltage during a charging phase, and the first terminal of the capacitor to output voltage and the second terminal of the capacitor to the ground in a discharging phase to reduce the input voltage. If the charge pump converter converts a variable input voltage that may be either higher or lower than the desired output voltage during operation, it is known as a buck-boost charge pump converter because it is capable of alternatively operating in the buck mode or in the boost mode depending on the value of the input voltage.

Buck-boost charge pump converters are attractive for many applications because of their low cost and ability to operate with batteries whose input voltages vary over a wide range as they progress from fully charged to discharged states. Typical buck-boost charge pump converters use five switches, two of which are double switches having transistors whose back-to-back body diodes prevent reverse conduction from the output of the converter to the input. The main source of efficiency loss in charge pump converters arises from large currents flowing through the transistors that create ohmic losses due to the non-zero on resistances of the transistors used for the switches. These losses are referred to as IR losses. In order to improve the conversion efficiency of buck boost converters, it would be desirable to reduce IR losses.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
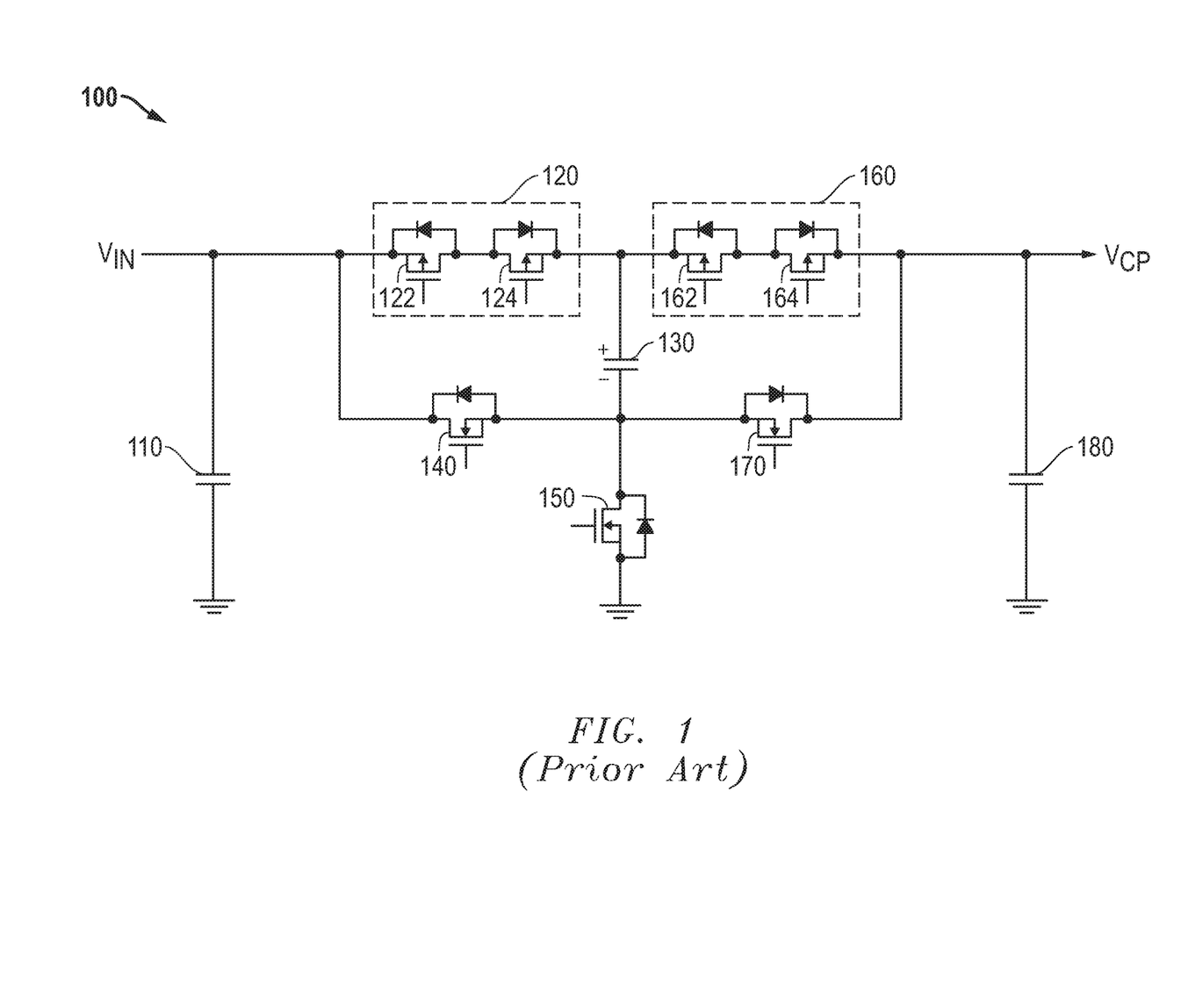
FIG. 1 illustrates in schematic form a buck-boost charge pump known in the prior art.

FIG. 1 illustrates in schematic form a buck-boost charge pump 100 known in the prior art. Buck-boost charge pump 100 includes an input capacitor 110, a double switch 120, a flying capacitor 130, a transistor 140, a transistor 150, a double switch 160, a transistor 170, and an output capacitor 180. Input capacitor 110 has a first terminal for receiving an input voltage labeled "$V_{IN}$", and a second terminal connected to ground.

Double switch 120 has a first terminal for receiving $V_{IN}$, a second terminal, and a control terminal. Double switch 120 includes transistors 122 and 124. Transistor 122 is a P-channel double-diffused metal-oxide-semiconductor (DMOS) transistor having a first source-drain terminal for receiving $V_{IN}$, a gate, a second source-drain terminal, and a body diode having an anode connected to the second source-drain terminal, and a cathode connected to the first source-drain terminal. Transistor 124 is a P-channel DMOS transistor having a first source-drain terminal connected to the second source-drain terminal of transistor 122, a gate, a second source-drain terminal, and a body diode having an anode connected to the first source-drain terminal, and a cathode connected to the second source-drain terminal.

Flying capacitor 130 has a first terminal connected to the second source-drain terminal of transistor 124, and a second terminal. Transistor 140 is a N-channel DMOS transistor having a first source-drain terminal for receiving $V_{IN}$, a gate, a second source-drain terminal connected to the second terminal of flying capacitor 130, and a body diode having an anode connected to the second source-drain terminal, and a cathode connected to the first source-drain terminal. Transistor 150 is a N-channel DMOS transistor having a first source-drain terminal connected to the second terminal of flying capacitor 130, a gate, a second source-drain terminal connected to ground, and a body diode having an anode connected to the second source-drain terminal, and a cathode connected to the first source-drain terminal.

Double switch 160 has a first terminal connected to the second terminal of double switch 120 and to the first terminal of flying capacitor 130, a second terminal for providing an output voltage labeled "$V_{CP}$", and a control terminal. Double switch 160 includes transistors 162 and 164. Transistor 162 is a P-channel DMOS transistor having a first source-drain terminal connected to the second terminal of double switch 120 and to the first terminal of flying capacitor 130, a gate, a second source-drain terminal, and a body diode having an anode connected to the second source-drain terminal, and a cathode connected to the first source-drain terminal. Transistor 164 is a P-channel DMOS transistor having a first source-drain terminal connected to the second source-drain terminal of transistor 162, a gate, a second source-drain terminal for providing $V_{CP}$, and a body diode having an anode connected to the first source-drain terminal, and a cathode connected to the second source-drain terminal.

Transistor 170 is a N-channel DMOS transistor having a first source-drain terminal connected to the second terminal of flying capacitor 130, to the second source-drain terminal of transistor 140, and to the first source-drain terminal of transistor 150, a gate, a second source-drain terminal connected to the second terminal of double switch 160, and a body diode having an anode connected to the first source-drain terminal, and a cathode connected to the second source-drain terminal. Output capacitor 180 has a first terminal connected to the second terminals of double switch 160 and transistor 170, and a second terminal connected to ground.

In operation, buck-boost charge pump 100 has a switching network of five switches including double switch 120, transistors 140 and 150, double switch 160, and transistor 170. Buck-boost charge pump 100 operates the switches in either a buck mode or a boost mode based the value of $V_{IN}$ compared to the desired value of $V_{CP}$. If $V_{IN}$ is greater than the desired value of $V_{CP}$, then the controller operates the switch network in a buck mode. If $V_{IN}$ is less than the desired value of $V_{CP}$, then the controller operates the switch network in a boost mode.

It is important for buck-boost charge pump 100 to operate as efficiently as possible. However there are certain circuit characteristics that reduce the efficiency of operation. Every transistor has an on resistance that reduces the efficiency through IR losses. Moreover buck-boost charge pump 100 uses P-channel transistors in double switches 120 and 160, but these switches have higher on resistance for a give size in typical CMOS manufacturing processes. This imbalance makes it necessary to increase their sizes relative to the N-channel transistors to achieve less than a given amount of on resistance. The double switches themselves are used to prevent reverse current flow through the corresponding body diodes when the switches are nonconductive, but the use of two transistors increases on resistance when the switches are conductive. The operation of buck-boost charge pump 100 in both buck and boost modes and in charging and discharging phases will now be described.

Figure 2:
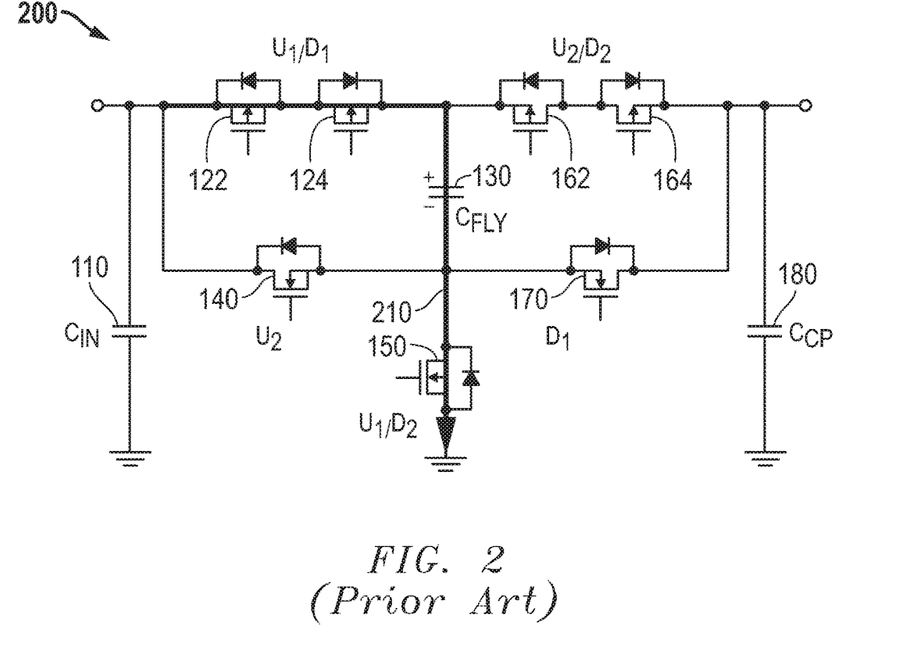
FIG. 2 illustrates in schematic form a diagram showing the operation of the buck-boost charge pump of FIG. 1 during a charging phase of a boost mode.

FIG. 2 illustrates in schematic form a diagram 200 showing the operation of buck-boost charge pump 100 of FIG. 1 during a charging phase of a boost mode. In this and the following FIGS., the phases in which the respective transistors are conductive are indicated by a notation adjacent to the circuit elements, in which "$U_1$" represents the charging phase of the boost (or "up") mode, "$U_2$" represents the discharging phase of the boost mode, "$D_1$" represents the charging phase of the buck (or "down") mode, and "$D_2$" represents the discharging phase of the boost mode. Diagram 200 shows a conduction path 210 in which the controller makes transistors 122 and 124 in double switch 120 and transistor 150 conductive, while making all other transistors nonconductive. Conduction path 210 charges flying capacitor 130 with a positive voltage between the first and second terminals thereof. Conduction path 210 includes two P-channel transistors and one N-channel transistor that reduce the voltage across flying capacitor 130 due to IR drops of the respective ON resistances.

Figure 3:
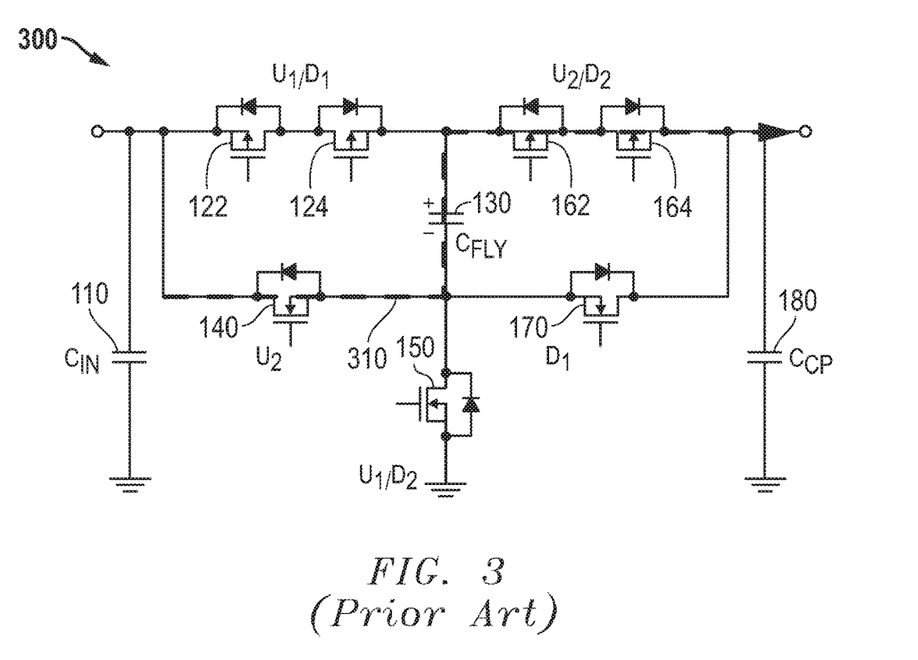
FIG. 3 illustrates in schematic form a diagram showing the operation of the buck-boost charge pump of FIG. 1 during a discharging phase of the boost mode.

FIG. 3 illustrates in schematic form a diagram 300 showing the operation of buck-boost charge pump 100 of FIG. 1 during a discharging phase of the boost mode. Diagram 200 shows a conduction path 310 in which the controller makes transistor 140 and transistors 162 and 164 in double switch 160 conductive, while making all other transistors nonconductive. Conduction path 310 boosts the voltage on the first terminal of flying capacitor 130 by increasing the voltage on the second terminal of flying capacitor 130 by an amount equal to approximately $V_{IN}$. Conduction path 310 includes one N-channel transistor and two P-channel transistors that reduce the boosted voltage of $V_{CP}$ due to IR drops of the respective ON resistances.

Figure 4:
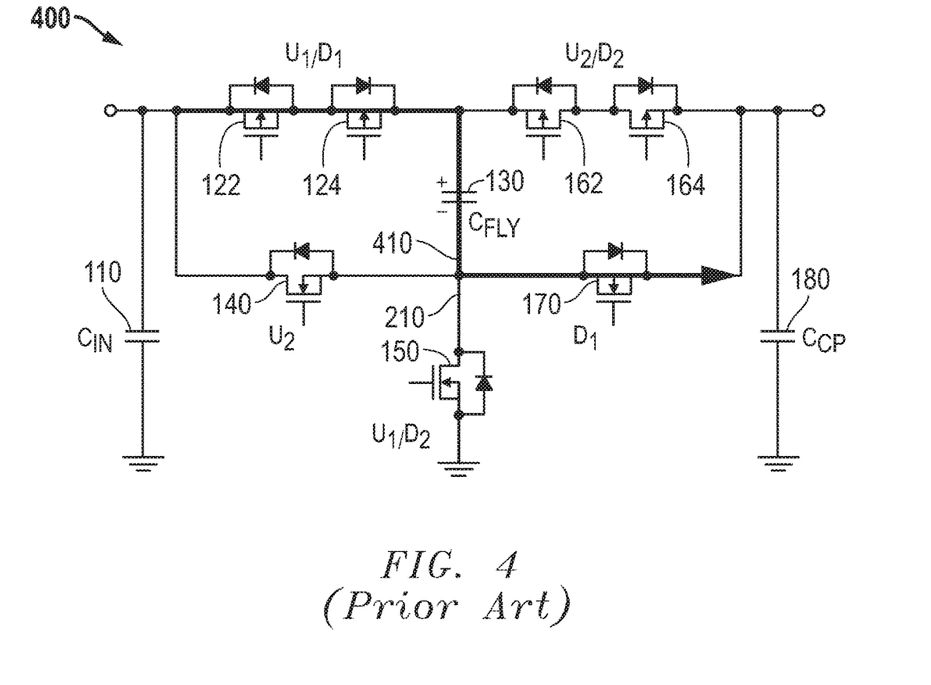
FIG. 4 illustrates in schematic form a diagram showing the operation of the buck-boost charge pump of FIG. 1 during a charging phase of a buck mode.

FIG. 4 illustrates in schematic form a diagram 400 showing the operation of buck-boost charge pump 100 of FIG. 1 during a charging phase of a buck mode. Diagram 400 shows a conduction path 410 in which the controller makes transistors 122 and 124 in double switch 120 and transistor 170 conductive, while making all other transistors nonconductive. Conduction path 410 charges flying capacitor 130 with a positive voltage between the first and second terminals thereof according to the difference between $V_{IN}$ and $V_{CP}$. Conduction path 410 includes two P-channel transistors and one N-channel transistor that reduce the voltage across flying capacitor 130 due to IR drops of the respective ON resistances.

Figure 5:
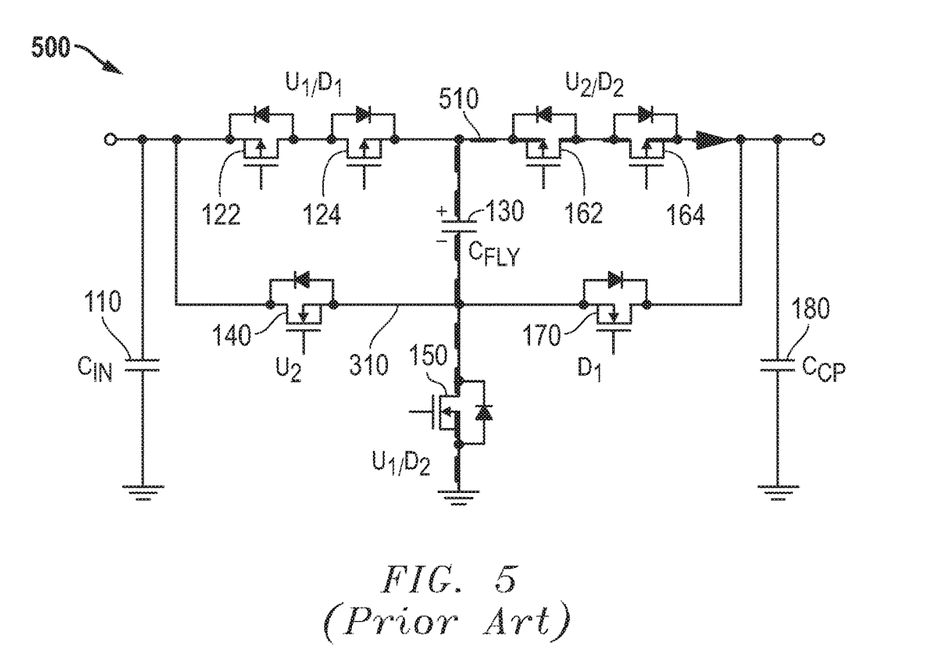
FIG. 5 illustrates in schematic form a diagram showing the operation of the buck-boost charge pump of FIG. 1 during a discharging phase of the buck mode.

FIG. 5 illustrates in schematic form a diagram 500 showing the operation of buck-boost charge pump 100 of FIG. 1 during a discharging phase of the buck mode. Diagram 500 shows a conduction path 510 in which the controller makes transistor 150 and transistors 162 and 164 in double switch 160 conductive, while making all other transistors nonconductive. Conduction path 510 reduces the voltage on $V_c$p according to the difference between $V_{IN}$ and $V_{CP}$. Conduction path 510 includes one N-channel transistor and two P-channel transistors that reduce the voltage drop on $V_{CP}$ due to IR drops of the respective ON resistances.

Thus in each of the charging and discharging phases of each of the buck and boost modes, the efficiency of the charge pumping operation is reduced by the ON resistance of two P-channel transistors and one N-channel transistor. To increase the efficiency of this architecture, the sizes of the transistors can be increased, but this increase adds to the cost of the converter. Moreover the P-channel transistors used in the double switches have to be increased more that corresponding N-channel transistors due to the difference in conductivities between N- and P-channel transistors in many typical CMOS processes.

However according to the embodiments disclosed herein, the inventor has developed a technique to improve the efficiency of the hysteretic buck-boost conversion without having to increase device size. A new hysteretic buck-boost converter that achieves this improved efficiency will now be described.

Figure 6:
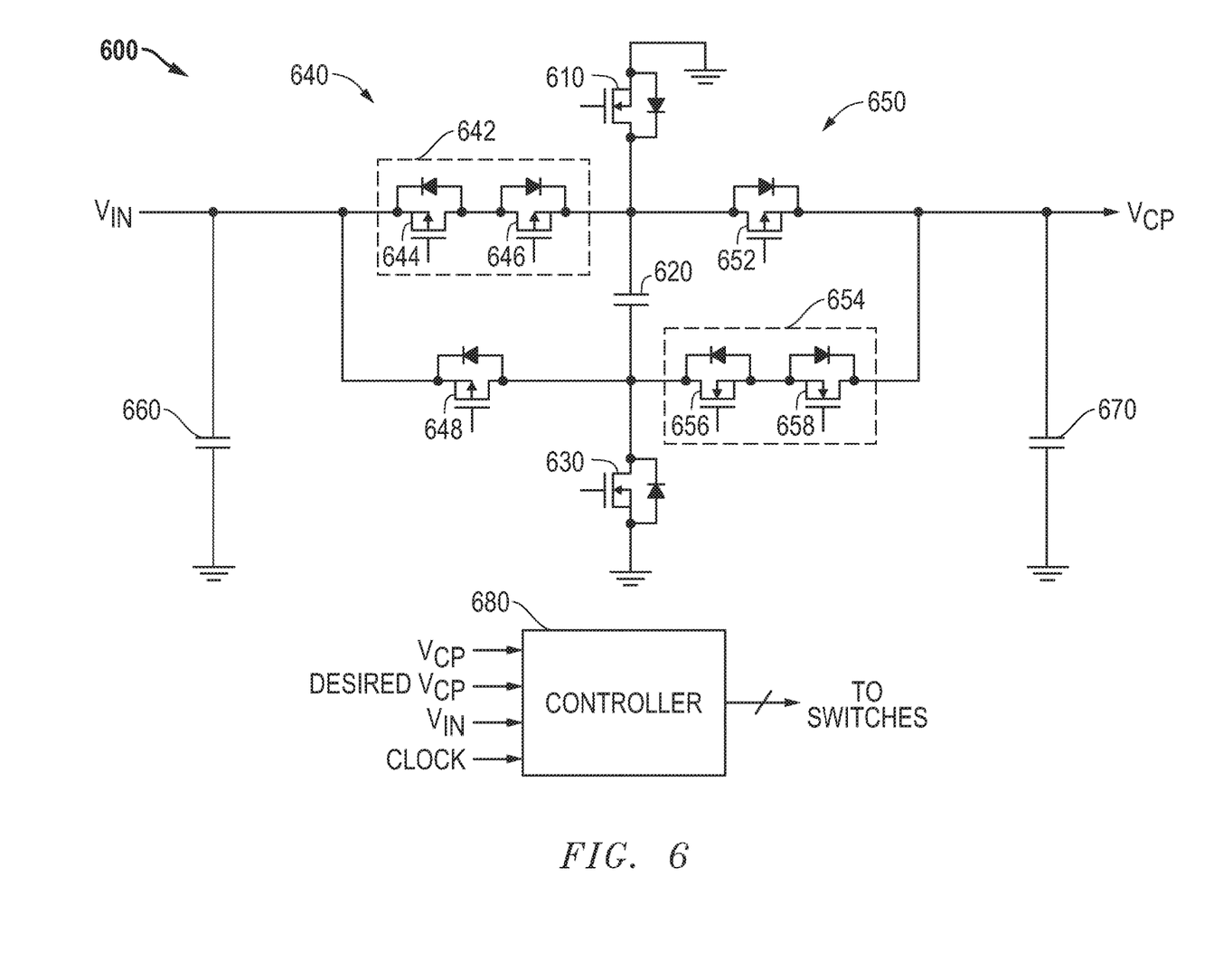
FIG. 6 illustrates in schematic form a buck-boost charge pump according to an embodiment of the present invention.

FIG. 6 illustrates in schematic form a buck-boost charge pump 600 according to an embodiment of the present invention. Buck-boost charge pump 600 includes a transistor 610, a flying capacitor 620, a transistor 630, an input switching section 640, an output switching section 650, an input capacitor 660, an output capacitor 670, and a controller 680.

Transistor 610 is an N-channel DMOS transistor having a first source-drain terminal connected to ground, a gate, a second source-drain terminal, and a body diode having an anode connected to the first source-drain terminal, and a cathode connected to the second source-drain terminal. Flying capacitor 620 has a first terminal connected to the second source-drain terminal of transistor 610, and a second terminal. Transistor 630 is an N-channel DMOS transistor having a first source-drain terminal connected to the second terminal of flying capacitor 620, a gate, a second source-drain terminal connected to ground, and a body diode having an anode connected to the second source-drain terminal, and a cathode connected to the first source-drain terminal.

Input switching section 640 includes a double switch 642 and a transistor 648. Double switch 642 has a first terminal for receiving $V_{IN}$, a second terminal, and a control terminal. Double switch 642 includes transistors 644 and 646. Transistor 644 is a P-channel DMOS transistor having a first source-drain terminal for receiving $V_{IN}$, a gate, a second source-drain terminal, and a body diode having an anode connected to the second source-drain terminal, and a cathode connected to the first source-drain terminal. Transistor 646 is a P-channel DMOS transistor having a first source-drain terminal connected to the second source-drain terminal of transistor 644, a gate, a second source-drain terminal connected to the first terminal of flying capacitor 620, and a body diode having an anode connected to the first source-drain terminal, and a cathode connected to the second source-drain terminal. Transistor 648 is an P-channel DMOS transistor having a first source-drain terminal for receiving $V_{IN}$, a gate, a second source-drain terminal connected to the second terminal of flying capacitor 620 and the first source-drain terminal of transistor 630, and a body diode having an anode connected to the second source-drain terminal, and a cathode connected to the first source-drain terminal.

Output switching section 650 includes a transistor 652 and a double switch 654. Transistor 652 is an P-channel DMOS transistor having a first source-drain terminal connected to the first terminal of flying capacitor 620, a gate, a second source-drain terminal for providing output voltage $V_{CP}$, and a body diode having an anode connected to the first source-drain terminal, and a cathode connected to the second source-drain terminal. Double switch 654 has a first terminal connected to the second terminal of flying capacitor 620, to the second source-drain terminal of transistor 648, and to the first source-drain terminal of transistor 630, a second terminal, and a control terminal. Double switch 654 includes transistors 656 and 658. Transistor 656 is a N-channel DMOS transistor having a first source-drain terminal connected to the second terminal of flying capacitor 620, to the second source-drain terminal of transistor 648, and to the first source-drain terminal of transistor 630, a gate, a second source-drain terminal, and a body diode having an anode connected to the second source-drain terminal, and a cathode connected to the first source-drain terminal. Transistor 658 is a N-channel DMOS transistor having a first source-drain terminal connected to the second source-drain terminal of transistor 656, a gate, a second source-drain terminal connected to the second source-drain terminal of transistor 652, and a body diode having an anode connected to the first source-drain terminal, and a cathode connected to the second source-drain terminal.

Input capacitor 660 has a first terminal for receiving $V_{IN}$, and a second terminal connected to ground. Output capacitor 670 has a first terminal connected to the second terminals of transistor 652 and double switch 654, and a second terminal connected to ground. Controller 680 has a first input for receiving output voltage $V_{CP}$, a second input for a desired value of $V_{CP}$, a third input for receiving input voltage $V_{IN}$, a fourth input for receiving a clock signal labeled "CLOCK", and a set of outputs connected to the gates of respective transistors in the single- and double-switches.

In operation, buck-boost charge pump 600 uses a six-switch charge pump architecture with a single flying capacitor. It operates more efficiently than buck-boost charge pump 100 of FIG. 1 by reducing the IR losses through the conduction paths with the addition of a single transistor, transistor 610. In buck-boost charge pump 100, flying capacitor 130 was polarized such that its first terminal was always biased to a voltage higher than the voltage on its second terminal. However in buck-boost charge pump 600, controller 680 reverses the polarity of flying capacitor 620 during the buck and boost modes to reduce the number of switching elements through which the conduction path is formed. In particular, reversing the polarization of flying capacitor 620 eliminates the need for the use of a double switch during one phase of each of the boost and buck modes, reducing the conduction path resistance. Moreover reversing the polarization of the flying capacitor further allows the use of N-channel transistors for the double switch used in the buck mode, allowing further reduction in path resistance in the buck mode. The operation of buck-boost charge pump 600 will now be described based on the same modes and phases as described above for buck-boost charge pump 100.

Figure 7:
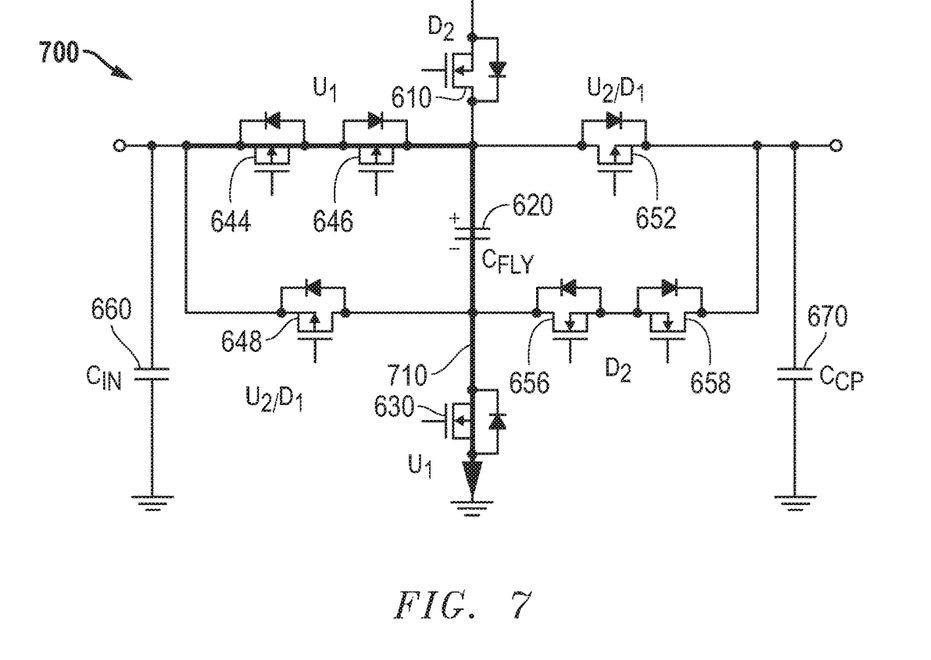
FIG. 7 illustrates in schematic form a diagram showing the operation of the buck-boost charge pump of FIG. 6 during the charging phase of the boost mode.

FIG. 7 illustrates in schematic form a diagram 700 showing the operation of buck-boost charge pump 600 of FIG. 6 during the charging phase of the boost mode. Diagram 700 shows a conduction path 710 in which controller 680 makes transistors 644 and 646 in double switch 642 and transistor 630 conductive, while making all other transistors nonconductive. Conduction path 710 charges flying capacitor 620 with a positive voltage between the first and second terminals thereof. Conduction path 710 includes two P-channel transistors and one N-channel transistor that reduce the voltage across flying capacitor 620 due to IR drops of the respective ON resistances.

Figure 8:
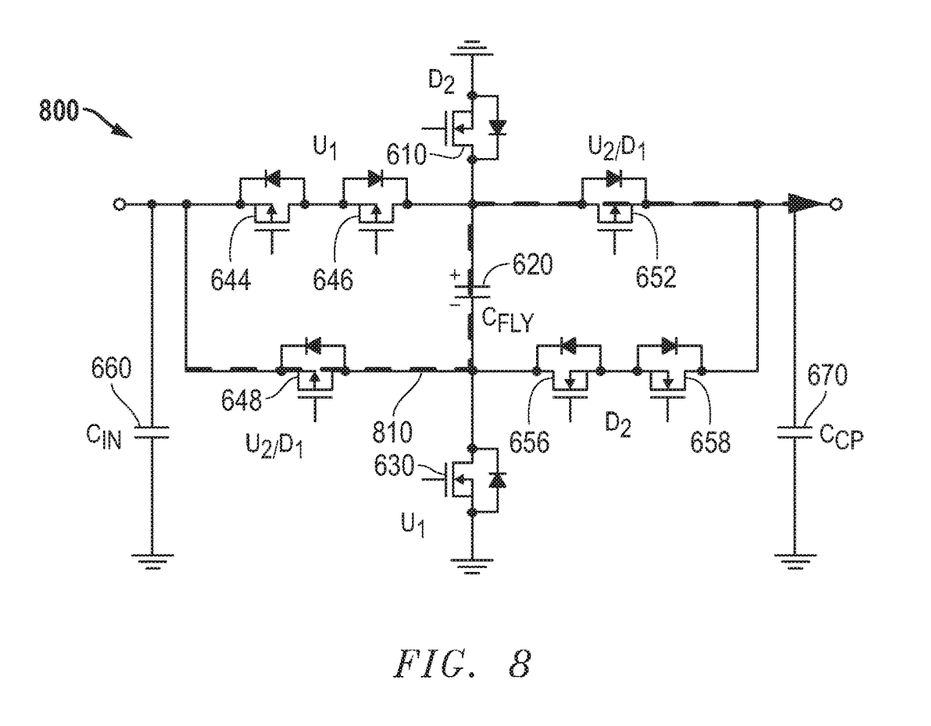
FIG. 8 illustrates in schematic form a diagram showing the operation of the buck-boost charge pump of FIG. 6 during the discharging phase of the boost mode.

FIG. 8 illustrates in schematic form a diagram 800 showing the operation of buck-boost charge pump 600 of FIG. 6 during the discharging phase of the boost mode. Diagram 800 shows a conduction path 810 in which controller 680 makes transistor 648 and transistor 652 conductive, while making all other transistors nonconductive. Conduction path 810 boosts the voltage on the first terminal of flying capacitor 620 by increasing the voltage on the second terminal thereof by an amount equal to approximately $V_{IN}$. Conduction path 810 includes two P-channel transistors that reduce the boosted voltage at the first terminal of flying capacitor 620 due to IR drops of the respective ON resistances.

Figure 9:
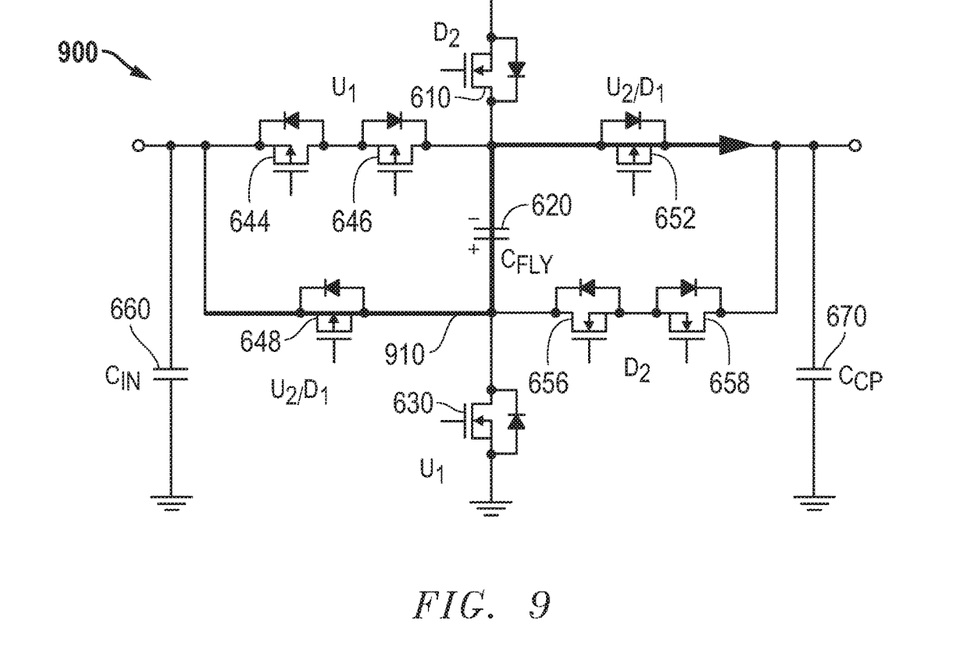
FIG. 9 illustrates in schematic form a diagram showing the operation of the buck-boost charge pump of FIG. 6 during the charging phase of the buck mode.

FIG. 9 illustrates in schematic form a diagram 900 showing the operation of buck-boost charge pump 600 of FIG. 6 during the charging phase of the buck mode. Diagram 900 shows a conduction path 910 in which controller 680 makes transistors 648 and 652 conductive, while making all other transistors nonconductive. Conduction path 910 charges flying capacitor 620 with a negative voltage between the first and second terminals thereof according to the difference between $V_{IN}$ and $V_{CP}$. Conduction path 910 includes two P-channel transistors that reduce the voltage across flying capacitor 620 due to IR drops of the respective ON resistances.

Figure 10:
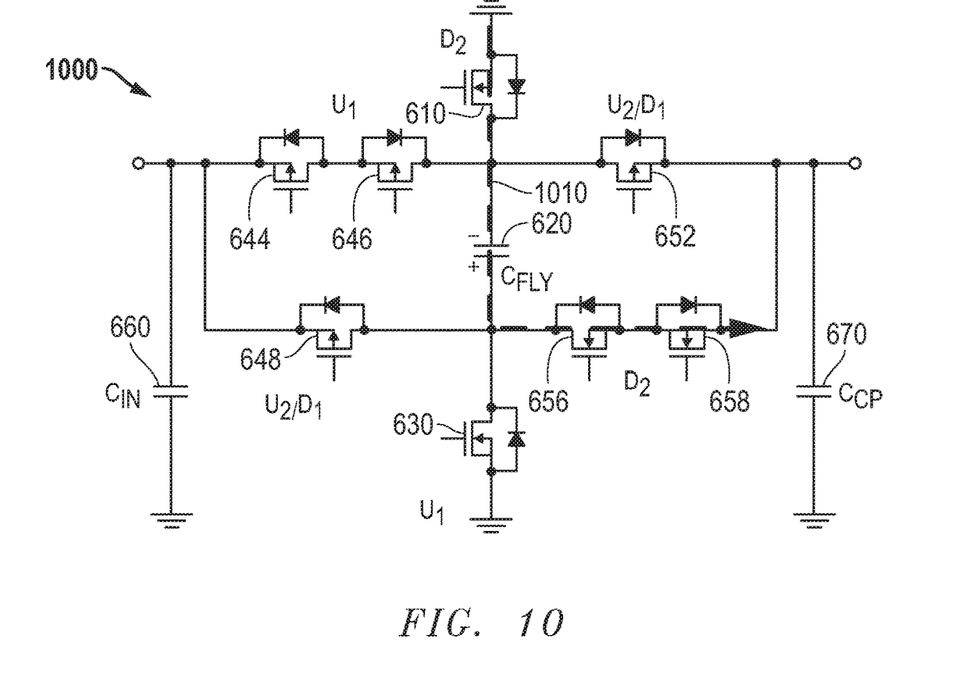
FIG. 10 illustrates in schematic form a diagram showing the operation of the buck-boost charge pump of FIG. 6 during the discharging phase of the buck mode.

FIG. 10 illustrates in schematic form a diagram 1000 showing the operation of buck-boost charge pump 600 of FIG. 6 during the discharging phase of the buck mode. Diagram 1000 shows a conduction path 1010 in which controller 680 makes transistor 610 and transistors 656 and 658 in double switch 654 conductive, while making all other transistors nonconductive. Conduction path 1010 reduces the voltage on the first terminal of flying capacitor 620 to ground and reduces the voltage on the second terminal of flying capacitor 620 according to the difference between $V_{IN}$ and $V_{CP}$. Conduction path 1010 includes three N-channel transistors that reduce the voltage drop on $V_{CP}$ due to IR drops of the respective ON resistances.

Thus in each of the charging and discharging phases of both the buck and boost modes, the efficiency of the charge pumping operation of buck-boost charge pump 600 is improved compared to that of buck-boost charge pump 100 of FIG. 1. In particular, the charging phase of the boost mode reduces the voltages by the ON resistance of two P-channel transistors and one N-channel transistor but the discharging phase only reduces the voltages by the ON resistance of two P-channel transistors. Thus during boost mode the IR losses only equal four P-channel transistors and one N-channel transistor. If in the particular process the P-channel conductivity is half of the N-channel transistor conductivity, then the total IR loss of buck-boost charge pump 100 is 4P+2N=4(2R)+2R=10R each switching cycle. However the total IR loss of buck-boost charge pump 600 is 4P+1N=4(2R)+1R=9R each switching cycle, which is a 10% decrease in IR loss.

Likewise, the charging phase of the buck mode reduces the voltages by the ON resistance of two P-channel transistors whereas the discharging phase reduces the voltages by the ON resistance of three N-channel transistors. Thus during buck mode the IR losses only equal two P-channel transistors and three N-channel transistor. If in the particular process the P-channel conductivity is half the N-channel transistor conductivity, then the total IR loss of buck-boost charge pump 100 is again 4P+2N=4(2R)+2R=10R each switching cycle. However the total IR loss of buck-boost charge pump 600 is 2P+3N=2(2R)+3R=7R, which is a 30% decrease in IR loss.

Thus by varying the polarity of the flying capacitor based on the selected mode and by adding a single N-channel transistor, buck-boost charge pump 600 operates at significantly higher efficiency compared to buck-boost charge pump 100 of FIG. 1.

Figure 11:
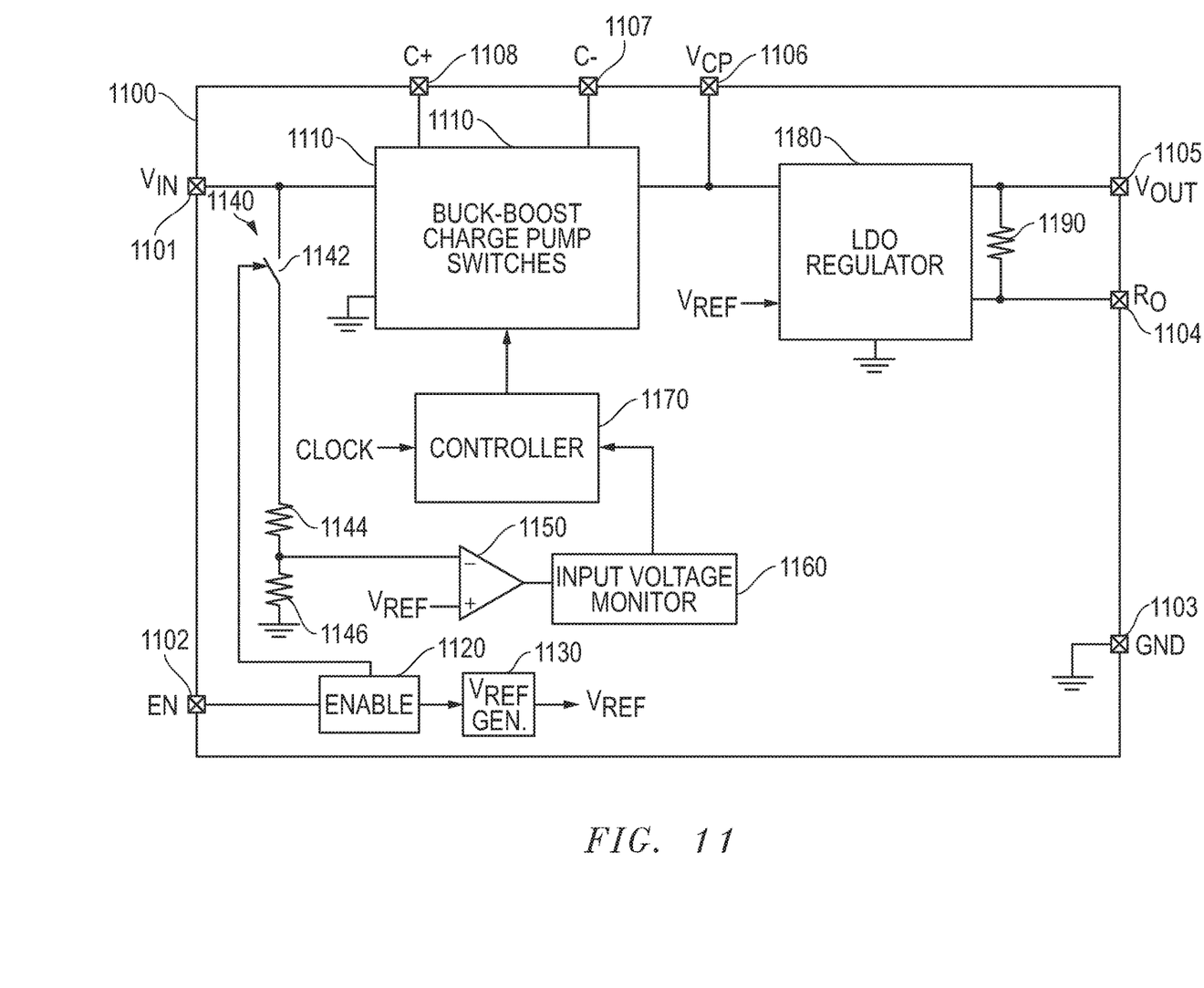
FIG. 11 illustrates in partial block diagram and partial schematic form an integrated circuit buck-boost converter according to another embodiment.

FIG. 11 illustrates in partial block diagram and partial schematic form an integrated circuit buck-boost converter 1100 according to another embodiment. Integrated circuit buck-boost converter 1100 includes a set of external terminals including a $V_{IN}$ terminal 1101, an enable (EN) terminal 1102, a ground terminal (GND) 1103, an output resistor (RO) terminal 1104, a voltage output terminal ($V_{OUT}$) 1105, a $V_{CP}$ terminal 1106, a negative capacitor terminal (C−) 1107, and a positive capacitor terminal (C+) 1108.

Internally, integrated circuit buck-boost converter 1100 includes a set of buck-boost charge pump switches 1110, an enable logic circuit 1120, a reference voltage ($V_{REF}$) generator 1130, a voltage divider circuit 1140, a comparator 1150, an input voltage monitor 1160, a controller 1170, a low dropout (LDO) regulator 1180, and a resistor 1190. Buck-boost charge pump power switches block 1110 has a voltage input terminal for receiving voltage $V_{IN}$, a ground terminal, a first flying capacitor terminal connected to C+ terminal 1108, a second flying capacitor terminal connected to C− terminal 1107, and an output connected to $V_{CP}$ terminal 1106.

Enable circuit 1120 has an input connected to EN terminal 1102, a first output, and a second output. $V_{REF}$ generator 1130 has an input connected to the output of enable logic circuit 1120, and an output for providing reference voltage $V_{REF}$.

Voltage divider circuit 1140 includes a switch 1142 and resistors 1144 and 1146. Switch 1142 has a first terminal for receiving $V_{IN}$, a second terminal, and a control terminal connected to the first output terminal of enable logic circuit 1120. Resistor 1144 has a first terminal connected to the second terminal of switch 1142, and a second terminal. Resistor 1146 has a first terminal connected to the second terminal of resistor 1144, and a second terminal connected to ground.

Comparator 1150 as a positive input connected to the output of $V_{REF}$ generator 1130 for receiving $V_{REF}$, a negative input connected to the second terminal of resistor 1144, and an output. Input voltage monitor 1160 has an input connected to the output terminal of comparator 1150, and an output. Controller 1170 has a first input for receiving the CLOCKK signal, a second input connected to the output of input voltage monitor 1160, and an output connected to the second input of buck-boost charge pump switches 1110.

LDO regulator 1180 has a first input connected to the output of buck-boost charge pump switches 1110, a second input for receiving $V_{REF}$, a third input connected to RO terminal 1104, a fourth input connected to ground, and an output for providing $V_{OUT}$. Resistor 1190 has a first terminal connected to $V_{OUT}$ terminal 1105, and a second terminal connected to RO terminal 1104.

In operation, integrated circuit buck-boost converter 1100 implements a buck-boost charge pump according to the principles described above in a practical application. EN terminal 1102 receives an enable signal that enables and disables the operation of integrated circuit buck-boost converter 1100. In response to a low voltage on EN terminal 1102, enable logic circuit 1120 disables the operation of integrated circuit buck-boost converter 1100 by, for example, opening switch 1142, disabling $V_{REF}$ generator 1130, and stopping the generation of clock signals in controller 1170. In response to a high voltage on EN terminal 1102, enable logic circuit 1120 enables the operation of integrated circuit buck-boost converter 1100 by, for example, closing switch 1142 to provide a divided voltage on the negative terminal of comparator 1150, enabling $V_{REF}$ generator 1130, and enabling the generation of clock signals to controller 1170.

During normal operation, enable logic circuit 1120 closes switch 1142. When switch 1142 is closed, then resistors 1144 and 1146 form a voltage divider. Comparator 1150 compares the divided value of $V_{IN}$ to $V_{REF}$ and input voltage monitor 1160 provides a mode signal to controller 1170 in response. If $V_{IN}$ is greater than the desired $V_{OUT}$ by at least a first amount, then controller 1170 operates buck-boost charge pump switches 1110 in the buck mode as described above. If $V_{IN}$ is less than the desired $V_{OUT}$, the controller 1170 operates buck-boost charge pump switches 1110 in the boost mode as described above. Thus when the divided value of $V_{IN}$ crosses $V_{REF}$, controller 1170 switches between the buck mode and the boost mode.

Integrated circuit buck-boost converter 1100 uses RO terminal 1104 to set the reference for LDO regulator 1180 of the desired value of $V_{OUT}$. $V_{OUT}$ is set by placing an external resistor from RO terminal 1104 to ground to form a resistor divider. The voltage at RO terminal 1104 forms the reference voltage for an LDO comparator that drives a pass device. LDO regulator 1180 changes $V_{OUT}$ to make the divided $V_{OUT}$ on RO terminal 1104 equal to $V_{REF}$.

Figure 12:
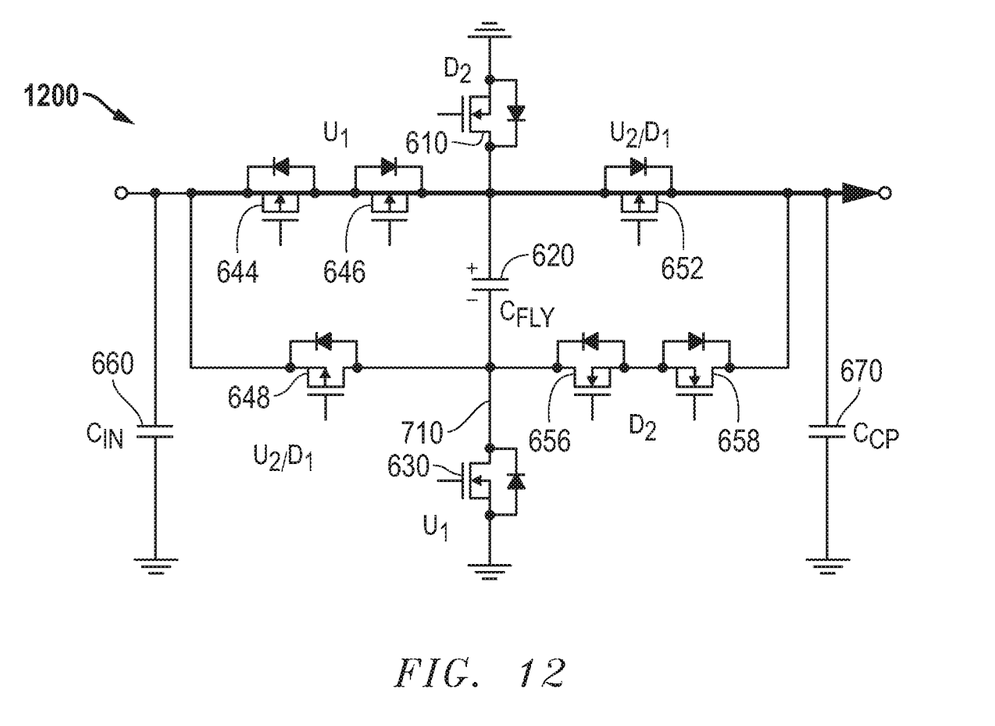
FIG. 12 illustrates in schematic form a diagram showing the operation of the buck-boost charge pump of FIG. 6 during the pass mode.

In another embodiment, controller 1170 can control buck-boost charge pump switches 1110 to operate in one of three modes based on the relationship between $V_{IN}$ and the desired $V_{OUT}$: buck, boost, and LDO. When $V_{IN}$ is greater than the desired $V_{OUT}$ by at least a first amount, controller 1170 operates buck-boost charge pump switches 1110 in the buck mode as described above. When $V_{IN}$ is less than the desired $V_{OUT}$ plus a minimum dropout voltage of LDO regulator 1180 (i.e. the value of $V_{CP}$-$V_{OUT}$ needed for proper operation of LDO regulator 1180), controller 1170 operates buck-boost charge pump switches 1110 in the boost mode as described above. When $V_{IN}$ is neither greater than the desired $V_{OUT}$ by at least the first amount nor less than the desired $V_{OUT}$ plus the minimum dropout voltage of LDO regulator 1180, then controller 1170 operates buck-boost charge pump switches 1110 in the LDO mode. Controller 1170 thus operates buck-boost charge pump switches 1110 in the LDO mode when $V_{IN}$ is within a range of voltages greater than the desired $V_{OUT}$. In this mode, the controller makes transistors 644, 646, and 652 conductive and all other transistors non-conductive, and passes $V_{IN}$ through buck-boost charge pump switches 1110 without alteration (except for the IR losses). FIG. 12 illustrates in schematic form a diagram showing the operation of buck-boost charge pump 600 of FIG. 6 during the pass mode. In this case, LDO regulator 1180 provides the slight amount of regulation needed to keep $V_{OUT}$ near its desired value. To implement this logic, comparator 1150 could be replaced by a range detector that determines the mode based on the relationship between $V_{IN}$ and the desired $V_{OUT}$.

Thus various embodiments of a buck-boost charge pump have been described. The buck-boost charge pump uses a single flying capacitor in a 6-switch configuration. The polarity of the capacitor varies based on the mode. For example in boost mode, the flying capacitor has a positive polarity between its first and second terminals, while in buck mode, the flying capacitor has a negative polarity between its first and second terminals. The 6-switch configuration allows a reduction in IR losses due to fewer switches being used during a switching cycle in both the buck mode and the boost mode.

The above-disclosed subject matter is to be considered illustrative, and not restrictive, and the appended claims are intended to cover all such modifications, enhancements, and other embodiments that fall within the true scope of the claims. For example, the buck-boost charge pump architecture supports a third mode in which the buck-boost switch network passes the input voltage to its output. In this case, an LDO regulator provides the additional regulation. The types of switches used can also vary between embodiments. Because of the high current required, DMOS transistors are well suited for the switches, but in other embodiments other transistor types are also possible. Moreover the efficient buck-boost charge pump architecture can be used with a variety of feedback control types, including hysteretic, pulse width modulation (PWM), and pulse frequency modulation (PFM), and the like. Also different mechanisms can also be used to preserve high efficiency at light loads, including frequency foldback, pulse skipping mode, and the like.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A buck-boost charge pump, comprising:
   a flying capacitor having a first terminal and a second terminal;
   a switch network comprising a first switch, a second switch, a third switch, a fourth switch, a first double switch, and a second double switch, wherein:
   said switch network couples an input terminal to said first terminal of said flying capacitor through said first double switch and said second terminal of said flying capacitor to a power supply voltage terminal using said second switch in a charging phase of a boost mode;
   said switch network couples said input terminal to said second terminal of said flying capacitor using said third switch and said first terminal of said flying capacitor to an output terminal using said fourth switch in both a discharging phase of said boost mode and a charging phase of a buck mode; and
   said switch network couples said power supply voltage terminal to said first terminal of said flying capacitor using said first switch and said second terminal of said flying capacitor to said output terminal through said second double switch in a discharging phase of said buck mode.

2. The buck-boost charge pump of claim 1, further comprising:
   an input capacitor having a first terminal coupled to said input terminal, and a second terminal coupled to said power supply voltage terminal; and
   an output capacitor having a first terminal coupled to said output terminal, and a second terminal coupled to said power supply voltage terminal.

3. The buck-boost charge pump of claim 1, further comprising:
   a controller responsive to an input voltage on said input terminal, an output voltage on said output terminal, and a difference between said input voltage and a desired output voltage to control said switch network in said charging and discharging phases of a selected one of said boost mode and said buck mode.

4. The buck-boost charge pump of claim 3, further comprising:
   a low dropout regulator having an input coupled to an output of said switch network, and an output for providing a voltage output,
   wherein said controller is further responsive to said input voltage being within a range of voltages greater than said desired output voltage to select a low dropout mode to control said switch network to pass said input voltage from said input terminal to said output terminal.

5. The buck-boost charge pump of claim 1, wherein said first switch, said second switch, said third switch, said fourth switch, said first double switch and said second double switch are implemented using DMOS transistors.

6. The buck-boost charge pump of claim 5, wherein said first switch, said second switch, and said second double switch are implemented using N-channel DMOS transistors, and said first double switch, said third switch, and said fourth switch are implemented using P-channel DMOS transistors.

7. The buck-boost charge pump of claim 1, wherein:
said first double switch comprises first and second DMOS transistors coupled in series and having back-to-back body diodes; and
said second double switch comprises first and second DMOS transistors coupled in series and having back-to-back body diodes.

8. The buck-boost charge pump of claim 7, wherein said first double switch is implemented using P-channel DMOS transistors, and said second double switch is implemented using N-channel DMOS transistors.

9. A buck-boost charge pump, comprising:
a first switch having a first source-drain terminal connected to a power supply voltage terminal, a control electrode, and a second source-drain terminal, and having a corresponding body diode having an anode coupled to said first source-drain terminal, and a cathode coupled to said second source-drain terminal;
a flying capacitor having a first terminal coupled to said second source-drain terminal of said first switch, and a second terminal;
a second switch having a first source-drain terminal connected to said second terminal of said flying capacitor, a control electrode, and a second source-drain terminal coupled to said power supply voltage terminal, and having a corresponding body diode having an anode coupled to said second source-drain terminal, and a cathode coupled to said first source-drain terminal;
a first double switch comprising first and second transistors with back-to-back body diodes between an input terminal that receives an input voltage, and said first terminal of said flying capacitor;
a third switch between an input terminal and said second terminal of said flying capacitor;
a fourth switch between said first terminal of said flying capacitor and an output terminal that provides an output voltage; and
a second double switch comprising first and second transistors with back-to-back body diodes between said second terminal of said flying capacitor and said output terminal,
wherein said buck-boost charge pump makes both said first and second transistors of said first double switch conductive in a charging phase of a boost mode, and both said first and second transistors of said second double switch conductive in a discharging phase of a buck mode.

10. The buck-boost charge pump of claim 9, further comprising:
an input capacitor having a first terminal coupled to said input terminal, and a second terminal coupled to said power supply voltage terminal; and
an output capacitor having a first terminal coupled to said output terminal, and a second terminal coupled to said power supply voltage terminal.

11. The buck-boost charge pump of claim 9, further comprising:
a controller responsive to said input voltage, said output voltage, and a difference between said input voltage and a desired output voltage to control said first switch, said second switch, said third switch, said fourth switch, said first double switch, and said second double switch selectively in said charging and discharging phases of said boost mode and said buck mode.

12. The buck-boost charge pump of claim 11, further comprising:

a low dropout regulator having an input coupled to said output terminal, and an output for providing a voltage output,
wherein said controller is further responsive to said input voltage being within a range of voltages greater than said desired output voltage to select a low dropout mode to control said first double switch and said fourth switch to pass said input voltage from said input terminal to said output terminal.

13. The buck-boost charge pump of claim 11, wherein in said boost mode:
said controller makes said first double switch and said second switch conductive and keeps said first switch, said third switch, said fourth switch, and said second double switch nonconductive in said charging phase; and
said controller makes said third switch and said fourth switch conductive, and said first and second switches and said first and second double switches nonconductive in a discharging phase.

14. The buck-boost charge pump of claim 11, wherein in said buck mode:
said controller makes said third switch and said fourth switch conductive, and said first and second switches and said first and second double switches nonconductive in a charging phase; and
said controller makes said first switch and said second double switch conductive and keeps said second switch, said first double switch, said third switch, said fourth switch, and said second double switch nonconductive in said discharging phase.

15. The buck-boost charge pump of claim 11, wherein said controller is further responsive to a clock signal to control duty cycles of said first switch, said second switch, said first and second double switches, and said third and fourth switches to regulate said output voltage to said desired output voltage.

16. The buck-boost charge pump of claim 11, wherein said first switch, said second switch, said first and second double switches, and said third and fourth switches are implemented using DMOS transistors.

17. The buck-boost charge pump of claim 16, wherein said first switch, said second switch, and said second double switch are implemented using N-channel DMOS transistors, and said first double switch and said third and fourth switches are implemented using P-channel DMOS transistors.

18. A method for providing an output voltage in either a buck mode or a boost mode, comprising:
during a charging phase of the boost mode:
coupling a first terminal of a flying capacitor to an input terminal through first and second transistors of a first double switch having back-to-back body diodes; and
coupling a second terminal of said flying capacitor to a power supply voltage terminal using a second switch;
during both a discharging phase of the boost mode and a charging phase of the buck mode:
coupling said second terminal of said flying capacitor to an input terminal using a third switch; and
coupling said first terminal of said flying capacitor to an output terminal using a fourth switch;
during a discharging phase of the buck mode:
coupling said first terminal of said flying capacitor to a power supply voltage terminal using a first switch; and coupling said second terminal of said flying capacitor to said output terminal through first and second transistors of a second double switch having back-to-back body diodes.

19. The method of claim 18, further comprising:
selecting the boost mode when an input voltage on said input terminal is less than a desired output voltage plus a dropout voltage of a low dropout voltage regulator provided to said output terminal;
selecting the buck mode when said input voltage is greater than said desired output voltage by at least a first amount; and
selecting a pass mode when said input voltage is greater than said desired output voltage plus said dropout voltage of said low dropout voltage regulator and less than said desired output voltage plus said first amount.

20. The method of claim 18, further comprising:
regulating an output voltage on said output terminal by modulating a pulse width of signals on said first switch, said second switch, said third switch, said fourth switch, said first double switch, and said second double switch.

* * * * *